Aug. 8, 1950     R. R. BOTTOMS     2,517,628
TEMPERATURE RESPONSIVE DEVICE
Filed May 13, 1947
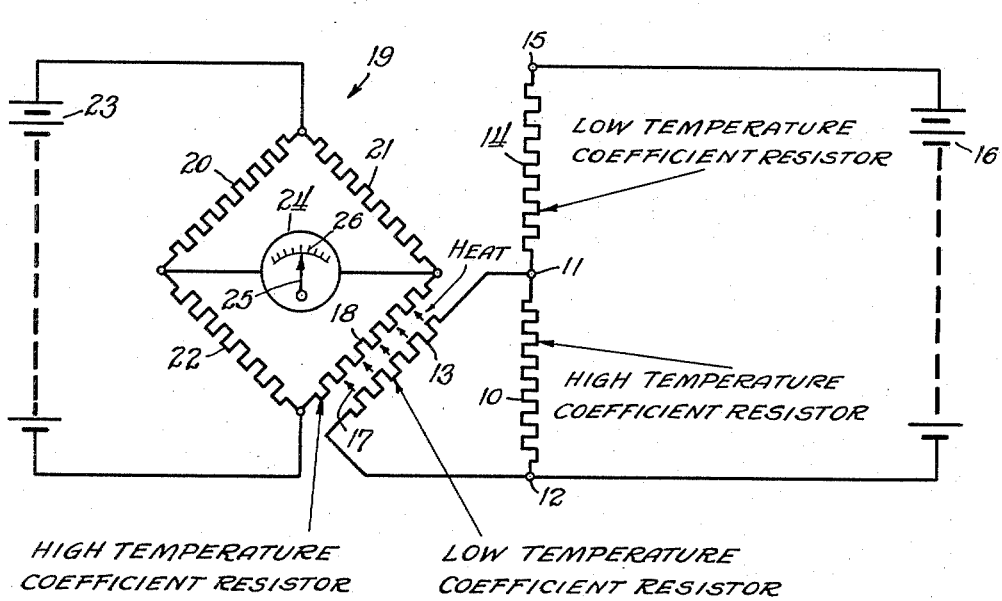
Inventor:
Robert Roger Bottoms.
By Brown, Jackson, Boettcher & Dienner
Attys.

Patented Aug. 8, 1950

2,517,628

UNITED STATES PATENT OFFICE 2,517,628

TEMPERATURE RESPONSIVE DEVICE

Robert Roger Bottoms, Crestwood, Ky., assignor to National Cylinder Gas Company, Chicago, Ill., a corporation of Delaware Application May 13, 1947, Serial No. 747,775

9 Claims. (Cl. 73—362)

My invention relates, generally, to temperature responsive devices, and it has particular relation to such devices for measuring small changes in ambient temperature for the determination of the constituents of gases by the thermal conductivity method although its use is not limited to this particular application.

Among the objects of my invention are: to measure slight variations in ambient temperature; to amplify the temperature changes so that the same can be measured with a high degree of accuracy; to employ resistance means subject to the temperature being measured and to change its resistance to a greater extent than the same would be changed as a result of the change in temperature alone; to employ a combination of low and high temperature coefficient resistors subject to the temperature being measured and energized from a constant voltage source for changing the resistance of said resistance means; and to measure the resistance of said resistance means for determining the temperature.

Other objects of my invention will, in part, be obvious and in part appear hereinafter.

Accordingly, my invention is disclosed in the embodiment thereof shown in the accompanying drawing and it comprises the features of construction, combination of elements, arrangement of parts and circuit connections described hereinafter, and the scope of the application of which will be indicated in the appended claims.

For a more complete understanding of the nature and scope of my invention, reference may be had to the following detailed description taken together with the accompanying drawing, in which the single figure illustrates, diagrammatically, a preferred embodiment of my invention.

Referring now particularly to the drawing, it will be observed that the reference character 10 designates a resistor having a high temperature coefficient of resistance and that its terminals are indicated at 11 and 12. The resistor 10 may be formed of iron, nickel, platinum or the like, so that the same will have a relatively high positive temperature coefficient of resistance with the result that, on change in the temperature to which it is subjected, there is a relatively large change in its electrical resistance.

Connected in shunt with resistor 10 and subject to the same ambient temperature is a resistor 13 which has a low temperature coefficient of resistance. The resistor 13 may have a substantially zero temperature coefficient of resistance and may be formed of any well-known material that will provide such a temperature characteristic, such as manganese copper or copper nickel alloys.

The resistors 10 and 13, as shown, are connected in series circuit relation with a resistor 14 that has a low temperature coefficient of resistance and may be formed of the same material as resistor 13. As a matter of fact, the resistors 13 and 14 may be considered as a single resistor with the resistor 10 connected in shunt circuit relation with a part thereof, such as the part 13. One terminal of the resistor 14 is indicated at 15.

The resistors 10, 13 and 14 may be energized from a suitable current source having a constant voltage. For example, they may be energized from a battery 16, which, as shown, is connected between terminals 12 and 15. Under a given ambient temperature condition to which all of the resistors 10, 13 and 14 are subjected, a predetermined current will flow through the resistor 14 and it will divide between resistors 10 and 13 inversely in accordance with their respective resistances. As a result of the current flow through resistor 13, heat will be generated thereby, as indicated by the arrows 17.

Since resistors 10, 13 and 14, under the assumed conditions, are subject to the same ambient temperature, when there is a change in the temperature, resistors 10 and 13 tend to change in temperature in a like amount. However, since resistor 10 is formed of a material having a high positive temperature coefficient of resistance, on increase in ambient temperature, its resistance will be increased while, since resistor 13 is formed of material having a low or zero temperature coefficient of resistance, its resistance will remain unchanged. Because of the increase in resistance of resistor 10, the current flowing therethrough will decrease and there will be a corresponding decrease in the current flow through resistor 14. This results in a decrease in the voltage drop across resistor 14 between terminals 11 and 15 and an increase in the voltage drop across resistor 13 between terminals 11 and 12. Because of the increase in voltage between the terminals 11 and 12, there will be an increase in the current flow through resistor 13 and a corresponding increase in the heat generated thereby.

It remains then to provide means for measuring the heat generated by the resistor 13 so that, by determining the increase in heat generated, it is possible to determine the increase in ambient temperature.

With a view to measuring the heat generated by the resistor 13, a resistor 18 may be employed having a high temperature coefficient of resistance, and it may be either a positive or a negative temperature coefficient. For purposes of the present invention, the resistor 18 may be formed of the same material as the resistor 10 and thus it may have a high positive temperature coefficient of resistance, although it will be understood that it is within the purview of my invention to employ a material having a high negative temperature coefficient of resistance for the resistor 18.

Since the resistor 18 has a high temperature coefficient of resistance, there will be a relatively great change in its resistance on change in heat generated by the resistor 13. Thus, assuming that the resistor 18 is subjected to the same ambient temperature as the resistors 10 and 13, there will be substantially greater change in its resistance as a result of the change in heat generated by resistor 13 under the conditions described hereinbefore, than would be the case if the change in its resistance were due solely to the change in ambient temperature. By measuring the change in the resistance of resistor 18, it is possible to determine the change in ambient temperature, the actual value of the resistance of resistor 18 corresponding to a particular ambient temperature.

The resistance of resistor 18 can be measured in various ways. As illustrated in the drawing, the resistor 18 may form one leg of a Wheatstone bridge that is indicated, generally, at 19. The other legs of the bridge 19 are indicated at 20, 21 and 22. The bridge 19 can be energized from a suitable source of constant voltage, such as a battery 23. A galvanometer 24 may be employed for measuring the degree of unbalance of the bridge 19. It may have a pointer 25 that swings over a scale 26 which, it will be understood, may be calibrated in terms of ambient temperature.

In the determination of the constituents of gases, such for example as the carbon dioxide content in nitrogen or air or the argon content in oxygen and like determinations, the overall change in voltage through conventional temperature responsive elements with slight temperature change is relatively low when the same are employed for this purpose. When the temperature measuring means, constructed in accordance with my invention as herein disclosed, is employed, it is possible to obtain substantially double the response for a given temperature change than is possible using the prior art apparatus. This makes it possible to obtain a higher degree of accuracy for the temperature measurements and to provide more rugged and reliable equipment than has heretofore been available.

Since certain further changes can be made in the foregoing construction and circuit connections and different embodiments of the invention can be made without departing from the spirit and scope thereof, it is intended that all matter shown in the accompanying drawing and described hereinbefore shall be interpreted as illustrative and not in a limiting sense.

I claim as my invention:

1. In temperature responsive means, in combination, low temperature coefficient resistance means adapted to be energized from a constant voltage source, high temperature coefficient resistance means connected in shunt circuit relation with a part of said low temperature coefficient resistance means whereby on change in ambient temperature the voltage drop across said shunted part of said low temperature coefficient resistance means is changed, and temperature responsive means in heat transfer relation to said shunted part of said low temperature coefficient resistance means for measuring the change in heat generated thereby resulting from current flow therethrough on change in ambient temperature.

2. The invention, as set forth in claim 1, wherein the second mentioned resistance means has a high positive temperature coefficient of resistance.

3. In temperature responsive means, in combination, low temperature coefficient resistance means adapted to be energized from a constant voltage source, high temperature coefficient resistance means connected in shunt circuit relation with a part of said low temperature coefficient resistance means whereby on change in ambient temperature the voltage drop across said shunted part of said low temperature coefficient resistance means is changed, high temperature coefficient resistance means disposed in heat transfer relation to said shunted part of said low temperature coefficient resistance means, and means for measuring the resistance of the last mentioned high temperature coefficient resistance means.

4. The invention, as set forth in claim 3, wherein the second and last mentioned resistance means each has a high positive temperature coefficient of resistance.

5. The invention, as set forth in claim 4, wherein the resistance measuring means comprises a Wheatstone bridge circuit, and the last mentioned resistance means is included in one leg thereof.

6. In temperature responsive means, in combination, a first resistor having a high temperature coefficient of resistance, a second resistor having a low temperature coefficient of resistance disposed in heat transfer relation with said first resistor, a third resistor having a high temperature coefficient of resistance connected in parallel with said second resistor, and a fourth resistor having a low temperature coefficient of resistance connected in series with said parallel connected second and third resistors, said resistors being subject to the same ambient temperature and said second, third and fourth resistors being arranged to be energized from a current source whereby the resistance of said first resistor changes on variation in the ambient temperature substantially more than it changes as a result of variation in ambient temperature alone.

7. The invention, as set forth in claim 6, wherein means are provided for measuring the resistance of the first resistor.

8. The invention, as set forth in claim 7, wherein the first and third resistors each has a high positive temperature coefficient of resistance.

9. The invention, as set forth in claim 6, wherein a Wheatstone bridge circuit is provided for measuring the resistance of the first resistor and said first resistor is included in one leg of said bridge circuit.

ROBERT ROGER BOTTOMS.

REFERENCES CITED

The following references are of record in the file of this patent:

UNITED STATES PATENTS

| Number | Name | Date |
| --- | --- | --- |
| 2,163,297 | Waage | June 20, 1939 |
| 2,230,779 | Johnson | Feb. 4, 1941 |